United States Patent
Selfridge et al.

(10) Patent No.: US 10,337,412 B2
(45) Date of Patent: Jul. 2, 2019

(54) LIQUID FUEL CONTROL VALVE FOR GAS TURBINE ENGINE AND METHOD FOR CONTROLLING FLOW OF LIQUID FUEL TO ENGINE

(71) Applicant: General Electric Company, Schenectady, NY (US)

(72) Inventors: Kenneth Eugene Selfridge, Greenville, SC (US); Hua Zhang, Greenville, SC (US)

(73) Assignee: General Electric Company, Schenectady, NY (US)

( * ) Notice: Subject to any disclaimer, the term of this patent is extended or adjusted under 35 U.S.C. 154(b) by 458 days.

(21) Appl. No.: 15/184,525

(22) Filed: Jun. 16, 2016

(65) Prior Publication Data

US 2017/0363016 A1 Dec. 21, 2017

(51) Int. Cl.
| | |
|---|---|
| F02C 9/26 | (2006.01) |
| F02C 7/232 | (2006.01) |
| F02C 9/28 | (2006.01) |
| F23R 3/36 | (2006.01) |
| F02C 9/40 | (2006.01) |

(52) U.S. Cl.
CPC ............. *F02C 9/263* (2013.01); *F02C 7/232* (2013.01); *F02C 9/28* (2013.01); *F02C 9/40* (2013.01); *F23R 3/36* (2013.01); *Y10T 137/86863* (2015.04); *Y10T 137/86879* (2015.04)

(58) Field of Classification Search
CPC .... F02C 9/28; F02C 9/263; F02C 9/40; F23R 3/36
See application file for complete search history.

(56) References Cited

U.S. PATENT DOCUMENTS

| | | | | |
|---|---|---|---|---|
| 4,128,113 | A * | 12/1978 | Hart ....................... | F16K 11/16 137/596.2 |
| 4,681,133 | A * | 7/1987 | Weston ................. | F16K 11/087 137/315.18 |
| 6,164,322 | A * | 12/2000 | Najmolhoda ......... | F15B 13/024 137/539 |
| 6,722,135 | B2 * | 4/2004 | Davis, Jr. ............... | F02C 7/228 60/39.281 |

(Continued)

OTHER PUBLICATIONS

Continental Controls Corp., Product Brochure, "Gas Fuel Metering Valve AGV50", undated, 4 pages.

(Continued)

*Primary Examiner* — Craig Kim
*Assistant Examiner* — Katheryn A Malatek
(74) *Attorney, Agent, or Firm* — Nixon & Vanderhye P.C.

(57) ABSTRACT

The invention may be embodied a valve for a combustor of a gas turbine, the valve including: a housing including a fluid inlet and fluid outlets; an actuator within the housing and movable between an open position and a closed position; a fluid path through the housing between the fluid inlet and the fluid outlets, wherein the fluid path is blocked while the actuator is in the closed positions such that fluid may not flow from the inlet to the outlets and fluid may not flow between the outlets, and wherein one of the fluid outlets is fluidly connected to a first combustion can of the combustor, and another of the fluid outlets is fluidly connected to a second combustion can of the combustor.

14 Claims, 9 Drawing Sheets

(56) References Cited

U.S. PATENT DOCUMENTS

2011/0271679 A1   11/2011   Mestroni et al.

OTHER PUBLICATIONS

Heinzmann, Product Brochure, "Olympus Gas Turbine Fuel Controls", 2015, 6 pages.
Woodward, Product Specification No. 03287, "Electric SonicFlo Gas Valves", Rev. A, May 2003, 4 pages.
Woodward, Product Specification No. 40135, "Liquid Shutoff Valve", Rev. D, Feb. 2005, 4 pages.
Woodward, Product Specification No. 40158, "1907 Large Liquid Fuel Valve with EM-35 Actuator", Rev. C, Nov. 2006, 4 pages.
Woodward, Product Specification No. 40179, "LQ25T Liquid Fuel Metering Valve", Rev. F, May 2013, 4 pages.

\* cited by examiner

LIQUID FUEL CONTROL VALVE FOR GAS TURBINE ENGINE AND METHOD FOR CONTROLLING FLOW OF LIQUID FUEL TO ENGINE

BACKGROUND OF THE INVENTION

The present invention relates to fuel delivery systems for gas turbine engines and particularly to liquid fuel control valves for industrial gas turbine engines.

An industrial gas turbine typically includes a combustor section including combustion cans, e.g., cylindrical combustion chambers, arranged in an annular array around the casing of the gas turbine. Fuel pipes deliver liquid fuel to each the combustion cans. The fuel valves may also pass water to the combustion cans to purge the fuel system the combustion cans to purge the fuel system.

Fuel valves coupled to the fuel pipes turn-on and turn-off the flow of fuel to the combustion cans. Each combustion can has at least one associated fuel valve. There may be more than one fuel valve associated with each combustion can if the can has primary and secondary fuel nozzles, and if fuel flows from multiple sources to the combustion can.

The fuel valves, fuel pipes and other fuel system components form a complex web near around the combustion section of the gas turbine. There is a long felt need to simplify and reduce the components that form the web around the combustion section.

BRIEF SUMMARY OF INVENTION

The fuel valves operate at high temperatures and deliver fuel at high pressure. Temperatures at the outside of the combustion cans may exceed 400 degrees Fahrenheit (200 degrees Celsius). A combustor, which includes the array of combustion cans, of a typical industrial gas turbine may consume twenty gallons (75 liters) of liquid fuel per minute at a fuel pressure of, for example, 1200 pounds per square inch gauge (psig) (8,300 kilopascals).

These extreme conditions pose difficulties for fuel valves and, particularly, for a dual fuel gas turbine which operates on gas or liquid fuel. The fuel valves should shift smoothly between to an open position that allows liquid fuel or water to flow to the combustor and a closed position. The fuel valves should shift smoothly despite the high temperatures near the combustion cans and despite undergoing a large temperature change as the cooling effect of the flow of fuel through the valve stops when the valve is closed. The valves should also move smoothly between open and closed positions regardless of the pressure of the fuel. Some conventional fuel valves do not operate well under the extreme conditions of a gas turbine and, particularly, do not smoothly shift between open and closed positions regardless of the fuel pressure.

The inventors conceived of a fuel valve that shifts smoothly between open and closed positions regardless of the pressure of the fuel in the fuel pipes. The inventors realized that conventional fuel valves shifted between open and closed positions by pushing a valve component against a fuel or water filled chamber in the valve. The force applied to slide the valve component had to overcome both the liquid pressure from the fuel or water, and the friction in the valve. The inventors realized that, by equalizing the pressures in the chambers of the fuel valve, the moving component in the fuel valve could slide without having to overcome the fuel pressure.

An industrial gas turbine may have a dozen or more combustion cans. Thus, there may be two dozen or more fuel valves for each gas turbine engine capable of operating on liquid or gas fuels. The inventors recognized that the large number of fuel valves on a conventional gas turbine could be reduced by at least half by designing a fuel valve that provides outputs for two or more combustion cans.

The invention may be embodied as a valve for use in gas turbine liquid on/off control for fuel or water flow to a combustion can and preferably to two or more combustion cans. Due to the pressure balanced feature of the valve, the valve can be moved between the open and closed positions by less actuator force than is required to move a valve that is not pressure balanced.

The valve may have two or more outlets for liquid fuel or water. Each outlet is isolated from the other outlets in the valve, while the valve is closed. Isolating the outlets while closed avoids a backflow (reverse flow) of liquid entering one outlet and flowing out the other outlet of the valve. Further, the valve has coke mitigating features, including smooth contour surfaces exposed to the fuel or water flowing through the valve.

The invention may be embodied a valve for a combustor of a gas turbine, the valve including: a housing including a fluid inlet and fluid outlets; an actuator within the housing and movable between an open position and a closed position; a fluid path through the housing between the fluid inlet and the fluid outlets, wherein the fluid path is blocked while the actuator is in the closed positions such that fluid may not flow from the inlet to the outlets and fluid may not flow between the outlets, and wherein one of the fluid outlets is fluidly connected to a first combustion can of the combustor, and another of the fluid outlets is fluidly connected to a second combustion can of the combustor.

The invention may also be embodied as a fuel skid configured to supply fuel to combustion cans of a gas turbine, the fuel skid comprising: a conduit configured to be coupled to a fuel source; a flow divider configured to divide a flow passage through the conduit into a number of fuel passages no greater than half of a number of the combustion cans; a manifold housing fuel valves, wherein each valve includes: a housing including a fluid inlet and fluid outlets, wherein the fluid inlet is fluidly connected to a respective one of the flow passages from the flow divider; an actuator within the housing and movable between an open position and a closed position; a fluid path through the housing between the fluid inlet and the fluid outlets; wherein the fluid path is blocked while the actuator is in the closed positions such that fluid may not flow from the inlet to the outlets and fluid may not flow between the outlets, and wherein one of the fluid outlets is fluidly connected to one of the combustion cans and the other of the fluid outlet is fluidly connected to another one of the combustion cans.

The invention may be further embodied as a method to control liquid flow to combustion cans of a gas turbine, the method comprising: supplying liquid to each of the combustion cans from fuel valves, wherein each fuel valve is coupled to at least two of the combustion cans and supplies the fluid to the at least two of the combustion cans; supplying the liquid to each of the fuel valves; controlling the flow of liquid through each of the fuel valves by an actuator in each of the fuel valves; moving the actuator in each of the fuel valves to an open position to allow liquid to flow through each of the fuel vales and from each valve to two of the combustion cans, and moving the actuator to a close position to block liquid flow from an inlet of each valve to outlets of the valves and block flow between the outlets.

DETAILED DESCRIPTION OF THE INVENTION

Figure 1:
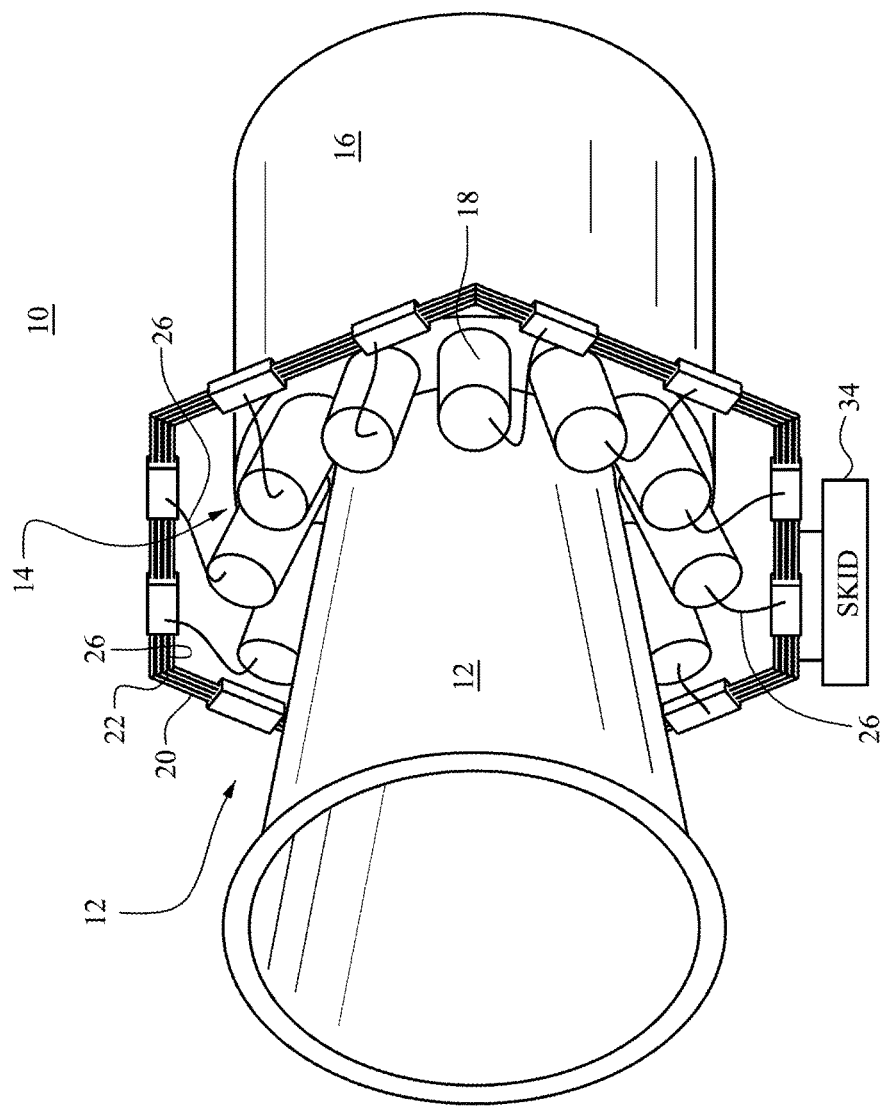
FIG. 1 is a diagram of a conventional industrial gas turbine with a network of fuel pipes and valves.

FIG. 1 shows a conventional industrial gas turbine 10 including a compressor 12, a combustor 14 and a turbine 16. The combustor includes combustion cans 18 arranged in a circular array around the casing of the gas turbine. Fuel is supplied to the combustion cans through a network of fuel pipes, such as a first annular fuel pipe 20, and a second annular fuel pipe 22 The first pipe 20 may distribute a gaseous fuel, e.g., natural gas, to the combustion cans. The second fuel pipe 22 may be for a liquid fuel, such as an oil based fuel. A third annular pipe 26 provides water to be mixed with fuel from the first or second fuel pipe. Connector pipes 28 extend from each of the first, second and third pipes to a respective one of the combustion cans.

Typically there is one conventional fuel valve for each of the lines between a fuel pipe and combustion can. The fuel valves for each combustion are conventionally arranged in a fuel manifold mounted to an end cover of the combustion can.

Figure 2:
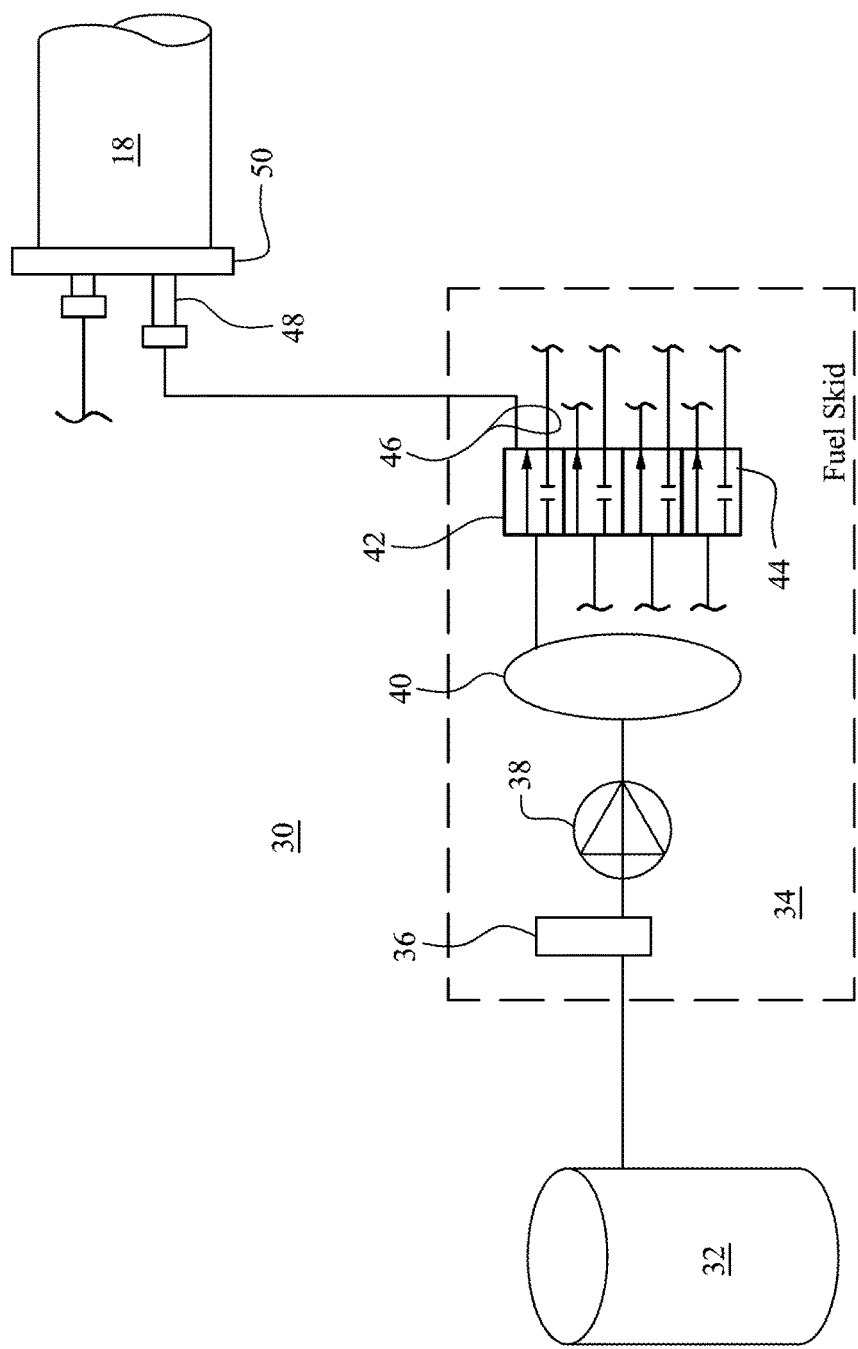
FIG. 2 is a schematic diagram of a fuel system providing fuel for a gas turbine, as represented by a combustion can.

FIG. 2 is a schematic diagram of portions of a fuel system 30 providing liquid fuel, and optionally water, to the combustor cans 18 of a gas turbine. A source 32 of fuel or water provides liquid to a fuel skid 34 adjacent the gas turbine. The fuel skid may include a fuel filter 36, a fuel pump(s) 38, an annular fuel pipe (conduit) 40 configured to encircle the combustor of the gas turbine, and one or more manifolds 42 of pressure balanced valves 44 coupled to one or more of the fuel or water pipes 40. There may be one manifold 42 for every two (or three or four) combustion cans. The manifolds may be arranged near the combustion cans and at different angular positions around the circumference of the combustor.

Each manifold 42 may house multiple, e.g., two, four or more, pressure balanced valves. Each valve 44 in a manifold 42 may include an inlet connected to a different one of the annular liquid fuel or water pipes that encircle the combustor. The liquid outlet(s) for each valve 44 may be connected to one, two, three or more of the combustion cans.

The fuel system 30 is shown only partially in FIG. 2 and in a simplified form. Components of the fuel system, such as other fuel or water pipes (such as 20, 22 and 26 in FIG. 1) and additional manifolds of fuel valves, that may be present in an embodiment of the fuel system but are not shown in FIG. 2.

Each pressure balanced valve 44 has an ON operating condition (see arrow in the block designated 44 in FIG. 2) in which liquid flows through the valve and into one, two or more pipes 46. Each pipe 46 may connect the fuel valve to a different one of the combustion chambers. The valve as an OFF operating position (see broken line in the block designated 44) in which no liquid flows into the pipes despite the flow of liquid from the flow divider. Thus, the pressure balanced valves 44 can be configured to function as an ON/OFF valve for liquid flowing to the combustion cans.

The outlets to the pressure balanced valves may be connected via a pipe 46 to a fuel nozzle 48 having an aft end extending from an end cover 50 of a combustor can. One connection between a pipe 46 and a fuel nozzle is shown in FIG. 2 and is representative of connections between the valves 44 and to several or all of the combustion cans in a gas turbine. For example, one pressure balanced valve 44 may have one output pipe 46 connected to one combustion can and another output pipe 46 connected to another combustion can.

Figure 3:
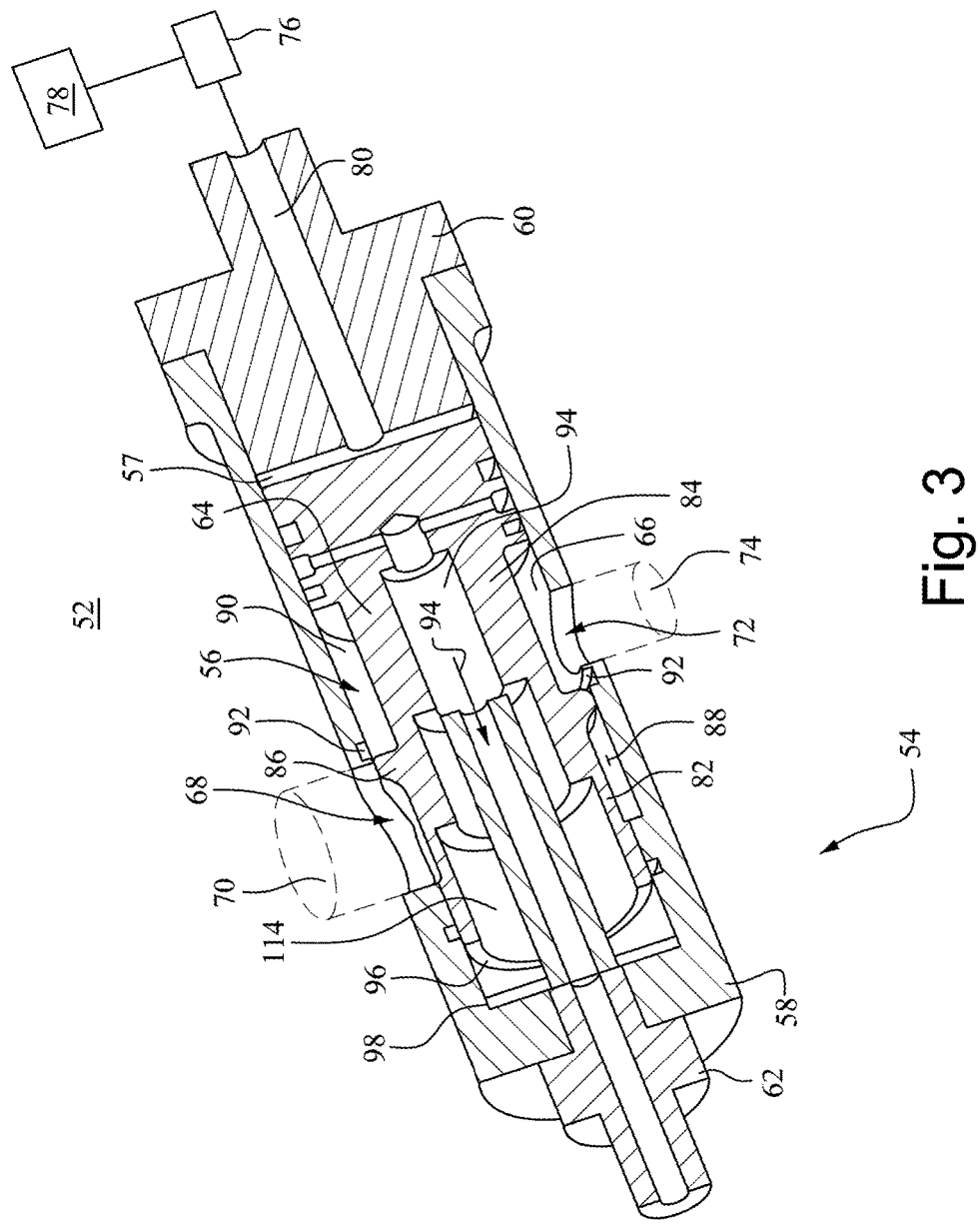
FIG. 3 is a perspective view of an exemplary pressure balanced valve shown in cross section.

FIG. 3 is a schematic diagram showing in cross section a pressure balanced valve 52, which may be used as a valve 44 in the manifold 42 of the fuel system 30 shown in FIG. 2. The valve 52 includes a housing assembly 54 with an interior chamber 56. The housing assembly may include a main housing 58, a header cap 60 and an end cap 62. The header cap and end cap fit in and seal opposite ends of the main housing. Interior surfaces of the header cap, main housing and end cap define the chamber 56 and seal the chamber.

An actuator 64 within the interior chamber and slidably engaged with the interior walls 66 of the chamber. A seal is formed between the actuator and the interior walls of the chamber.

An inlet opening 68 provides a flow path through the housing assembly 54 to the chamber. A coupling fitting 70 may extend outwardly from the housing and providing a connection between the flow path through the inlet opening and a pipe, such as an annular pipe extending around the combustor and coupled to a source of fuel or water.

An outlet opening 72 is provided in the housing to provide a flow path through the housing from the outlet chamber to a pipe, such as a pipe to a combustion can. A coupling fitting 74 may extend outwardly from the housing and provide a connection between the housing and a pipe to a combustion can. The pressure balanced valve 52 shown in FIG. 3 has a single outlet, whereas the valve shown in FIG. 4 has two outlets.

The actuator 64 is displaced, e.g., moved, with respect to the chamber 56 by a pneumatic or hydraulic fluid that is injected by a control system, e.g., a computer operated valve 76 and is supplied from a source 78 of the pneumatic or hydraulic fluid. A flow passage 80 is provided through the housing assembly, such as through the header cap, from a pipe between the valve 76 and to an end portion 57 of the interior chamber 56 through which flows the pneumatic or hydraulic fluid under pressure provided by the source of the fluid. The pressurized fluid flows through passage 80 and enters the end portion 57 56 to displace the actuator with respect to the chamber.

The actuator may be a generally cylindrical piston as shown in FIG. 3. The actuator has an outer body having reduced dimension section(s) 82, 84, as compared to a corresponding dimension, such as diameter, of the interior chamber 56, which may have a shaped complementary to the outer shape of the actuator. If the actuator is generally cylindrical as shown in FIG. 3, the inner wall 66 of the chamber may also be generally cylindrical. The reduced dimension sections of the actuator shown in FIG. 3 are a first cylindrical section 82 and a second cylindrical section 84. An annular ridge 86 extends radially outward and divides the first and second sections 82, 84. Due to the reduced dimensions of the first and second sections, annular cavities 88, 90 are formed in the chamber 66. The first annular cavity 88 is between the interior wall 66 of the cavity and outer surface of the actuator at the first reduced dimension 82 of the actuator, is aligned with the inlet opening 68 and is bounded at one end by the annular ridge 86. The second annular cavity 90 is between the interior wall 56 and the outer surface of the actuator at the second reduced dimension 84, is aligned with the outlet opening 72 and is bounded at one end by the annular ridge 86.

The displacement of the actuator 64 within the chamber 56 causes the pressure balanced valve 52 to open and close. The actuator is shown in a position in FIG. 3 which closes the valve. The annular ridge 86 on the actuator serves as a valve that closes the flow passage through the chamber 56 between the inlet and outlet openings 68, 78, while the actuator is in a closed position and opens the flow passage between the inlet and outlet openings while the actuator is in the open position.

In the closed position, the annular ridge on the actuator abuts a metal annular ring 92, e.g., a snap ring, is seated in an annular groove in the interior wall 66 of the main housing. A seal is formed between the outer rim of the annular ridge 86 and the annular ring 92 and the interior wall 66 adjacent the rim of the annular ridge. The seal prevents liquid fuel or water at the inlet opening 68 flowing into the outlet opening 72 of the pressure balanced valve 52.

The interior surface wall 66 of the chamber may be coated with PTFE (Teflon) particularly where the seals engage the wall. The coating reduces the risk that a seal will lock to the wall and prevent movement of the actuator. The PTFE coating also reduces coke build-up on the coated surfaces. Coke buildup is more likely at surfaces which have low flow velocities during fluid flow, such as the wall surfaces adjacent the seals.

While the actuator 52 is in the closed position, liquid from the inlet opening fills the first cavity 88 but does not fill the second cavity 90. The pressure of the liquid in the first cavity acts on the annular groove to push the groove against the annular ring 92 and, thus, promotes the seal between the annular ring and groove.

As the actuator moves in the direction of arrow 94, the annular ridge 86 unseats from the annular ring 92 and slides across the inlet opening 68. As the annular ring crosses into the inlet opening, liquid flows through the inlet into the second cavity 90 which is a passage to the outlet opening 72. The actuator may move in the direction of arrow 94 until the end 96 of the actuator abuts an end 98 of the chamber 56.

The actuator is in an open position while the end 96 of the actuator abuts or is near the end 98 of the chamber. A pressure balance is achieved while the actuator is in the open position. The pressure balance is due to the fuel (or water) fluid pressure acting on opposite sides of the annular ridge 86. By applying fluid pressure to opposite sides of the annular ridge, the fluid pressure of the fuel or water does not act to displace or resist movement of the actuator. The fluid pressure is balanced in the sense that the fluid pressure does not materially affect the movement of the actuator. The pressure balance allows the actuator 64 to be moved between the open and closed positions by a force that need only overcome the friction between the actuator and the main housing 58 and, optionally, a spring force that biases the actuator to a closed position.

To achieve the pressure balance in the valve 52, the exposed, e.g., wetted by the fluid, surface area of the annular ridge 86 should be the same on both sides of the ridge. Specifically, the wetted surface area projected on a plane perpendicular to the movement of the actuator should be substantially the same on both sides of the ridge. Substantial sameness of the wetted surface area means the projected surface area on one side of the ridge is within fifteen percent (15%) of the surface area on the other side of the ridge.

The actuator 64 has bearing surfaces 100, 106 that engage, e.g., slide against, the interior wall 66 of the chamber. The bearing surfaces may include a front bearing surface 100 oriented towards an end of the actuator facing the head cap. The front bearing surface 100 may be a cylindrical surface at the outer circumference of the actuator. The front bearing surface provides structural support for the actuator within the housing and holds the actuator within the housing while allowing for axial movement of the actuator.

Figure 4:
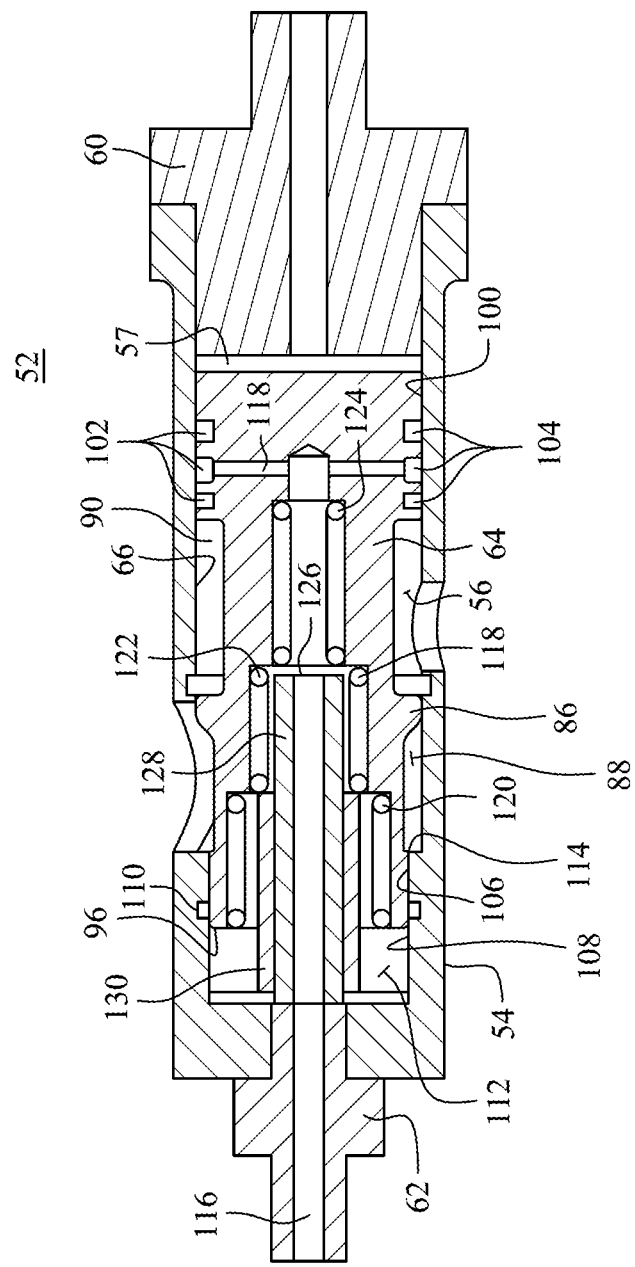
FIG. 4 is a side view of the pressure balanced valve shown in cross section.

As shown in FIG. 4, the actuator 64 may have a cylindrical front bearing surface 100 seated against the interior walls 66 of the housing assembly 53. The outer perimeter of the annular ridge 86 may also serve as a bearing surface between the actuator and the interior wall of the chamber.

The bearing surfaces 100 may have annular grooves 102 at a front portion of the actuator. These annular grooves receive annular seals 104, e.g., O-rings. The seals prevent the pneumatic or hydraulic fluid in the end portion 57 of chamber 56 from passing into the second cavity 90 and mixing with fuel or water in the cavity. The seals also prevent fuel or water from passing to and mixing with the hydraulic or pneumatic fluid.

A cylindrical rear bearing surface 106 may be on an outer end surface of the actuator near a rear end of the actuator. The rear bearing surface 106 may engage, e.g., slide against, a reduced diameter region 108 of the interior wall 66 of the chamber. A seal groove 110 may be formed in the interior wall 66 adjacent the rear bearing surface. A seal, e.g., O-ring, is seated in the seal groove 110 to prevent fuel or water fluid from leaking from the first cavity 88 and to a rear end 112 of the chamber 56 and into the end 62 of the actuator.

The reduced diameter region 106 starts at an annular step 114 in the interior wall 66. The annular step 114 defines an axial end of the first cavity 88. The cavity 88 has a second axial end at the annular ridge 86. Alternatively, the annular step 114 in the interior wall may be replaced by a step increase in the diameter of the actuator, such as the step increase that ends the second cavity 90 and starts the front bearing surface.

The end cap 62 at a rear of the housing assembly 54 may include a drain passage 116 to allow fluids in the chamber 56 to drain from the end of the actuator. A drain passage may provide a fluid path, such as a spoke and hub array of passages 118, from one or more of the seal grooves 102 in the front bearing surface, through the actuator and to the drain 116 in the end cap. The actuator may be at least partially hollow with an open end facing the end cap to provide a fluid passage for draining fluids from one or more of the seals in or adjacent the actuator.

Springs, such as helical coil springs, may be arranged within a cavity of the hollow actuator. The springs may be used to bias the actuator to the closed position. The springs may include one or more of first, second and third coil springs 120, 122 and 124. The springs are seated in successively larger diameter sections of the interior cavity of the actuator. The first spring 120 is in the narrowest section of the cavity and abuts, at one end, the end of the cavity. The opposite end of spring 120 abuts a collar 126 on a first cylindrical support post 128 extending to the end of the cavity of the actuator. The collar and first cylindrical support post that slidably engage the actuator. The spring 120 is compressed and applies a force that biases the actuator to a closed position, as shown in FIG. 4.

The second spring 122 is in a wider section of the cavity in the actuator. The second spring, at one end, abuts the collar and an opposite end of the second spring abuts an upper end of a second cylindrical support post 120 that contains and is coaxial with the first support post. The first and second springs bias the actuator in the close position.

The third spring 120 is seated in the widest section of the cavity in the actuator. The third spring extends slightly from the bottom of the actuator and pushes the actuator slightly away from the end of the chamber 56 in the housing assembly while the actuator is in an open position.

Figure 5:
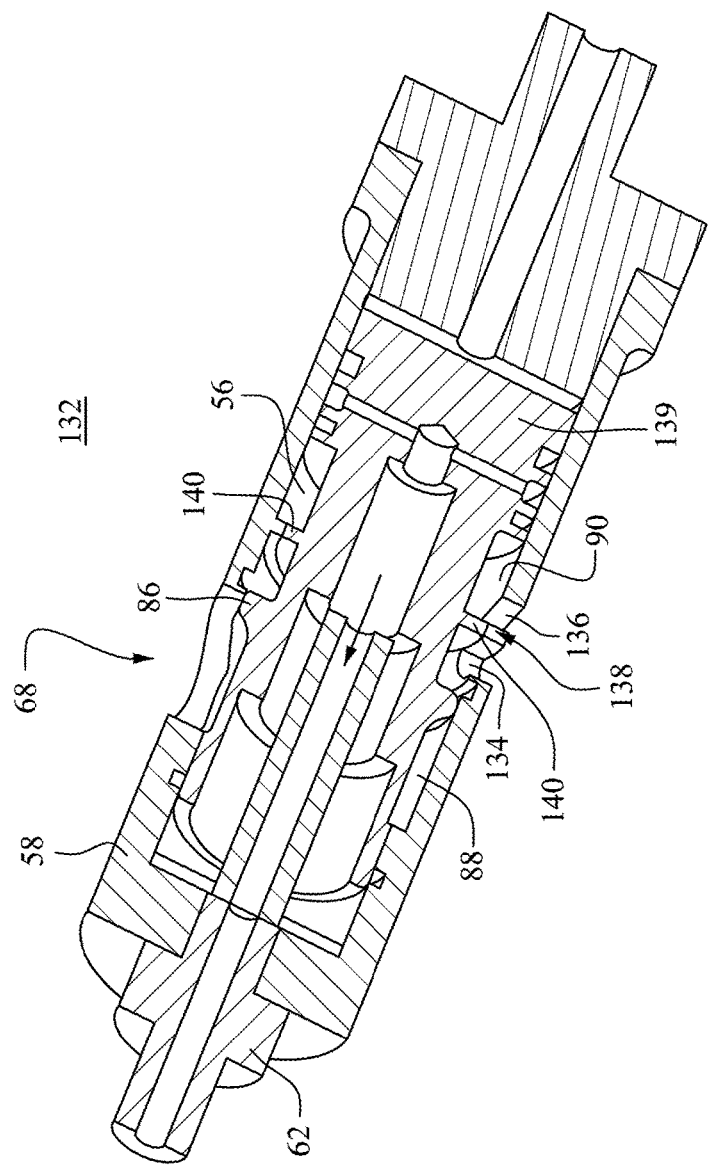
FIG. 5 is a side view of another embodiment of the pressure balanced valve shown in cross section.

FIG. 5 shows a second embodiment of a pressure actuated valve 132 which has a first and second outlets 134, 136 for fuel or water fluid that flow through the valve. The first and second outlets 134, 136 may be separated by a rib 138 extending across an opening in the housing assembly 54. The actuator 139 includes a second annular ridge 140 that is aligned with the rib 138 while the first annular ridge 186 is in a closed position and preventing fluid flowing from the inlet 68, through the interior chamber 66 and to the outlets 134, 136.

The second annular ridge 140 while aligned with the rib 138 also prevents fluid flow from one of the outlets 134 to the outer outlet 136, and vice versa. This isolation of the outlets ensures that any backflow of fluid from a combustion can does not flow into another combustion can while the valve 132 is closed.

As the actuator 132 moves towards the end cap 62, the first annular rib 86 shifts into the inlet opening 68 to allow fluid to flow into the second cavity 90 as well as the first cavity 88. The fluid flows through the second cavity 90 and into the outlets 134, 136. The movement of the actuator shifts the second annular ridge 140 away from the rib 138 and over one of the openings 134, 136. This shift of the second annular ridge 140 allows fluid to flow across the ridge 140 and into both of the outlets 134, 136.

Each of the outlets 134, 136 may be coupled to a different combustion can. Thus, one pressure balanced fuel valve 132 may provide fuel or water to two combustion cans.

Figure 6:
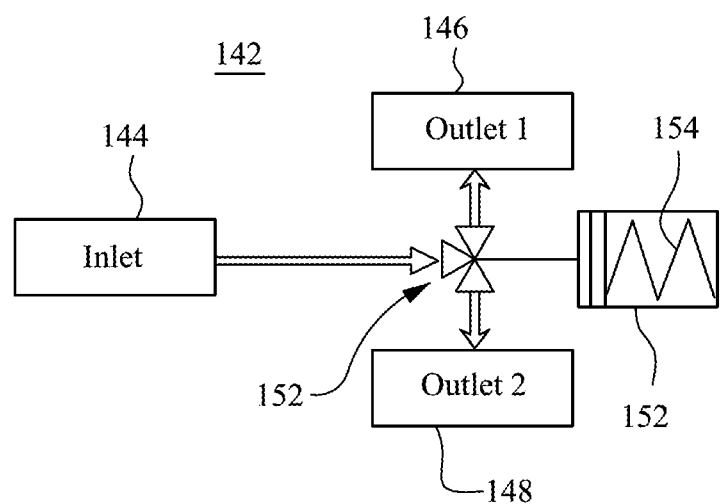
FIG. 6 is a schematic diagram of an embodiment of a pressure balanced valve.

FIG. 6 is a schematic view of a pressure balanced fuel valve 142. The valve includes an inlet 144, first and second outlets 146, 148, an actuator 150 having an open position in which fluid flows through the inlet, through the valve 152 and into both of the outlets 146, 148. The valve 152 has a closed position which blocks fluid flow from the inlet to either of the outlets and between the outlets. The actuator 152 may be configured to be pressure balanced such that it may be moved without having to overcome the fluid pressure in the valve. The actuator may also be biased, e.g., spring 154, in the closed position.

Figure 7:
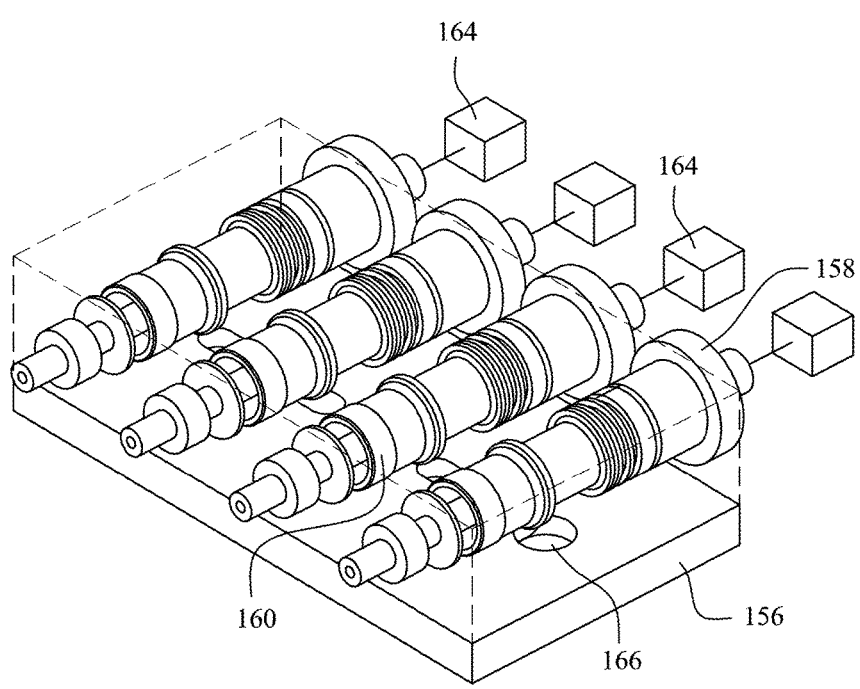
FIG. 7 is a perspective view of a manifold with pressure balanced valves.

FIG. 7 shows a manifold 156 in which four pressure balanced valves 158 are mounted. The manifold may be a housing that forms the housing assembly for each of the valves. In FIG. 6, the manifold is shown with dotted lines and without the housing assembly to better show the actuators 160 in each valve.

A hydraulic, pneumatic or mechanical force mechanism 164 may be attached to an end of each actuator and configured to move the actuator within the housing assembly for each valve. The fluid inlet to each valve is not shown in FIG. 6. One of the two fluid outlets 166 for each of the valves is shown at the bottom of the manifold.

The valve may be assembled together with other valves in a compact valve manifold, as shown in FIG. 7. The valve manifold is comprised of valves which supply fuel and other valves that supply water to the combustion cans. An annular arrangement of valve manifolds may be supported by a fuel skid and connected to the fuel and water pipes that extend around the combustor of a gas turbine, as shown in FIG. 1.

Figure 8:
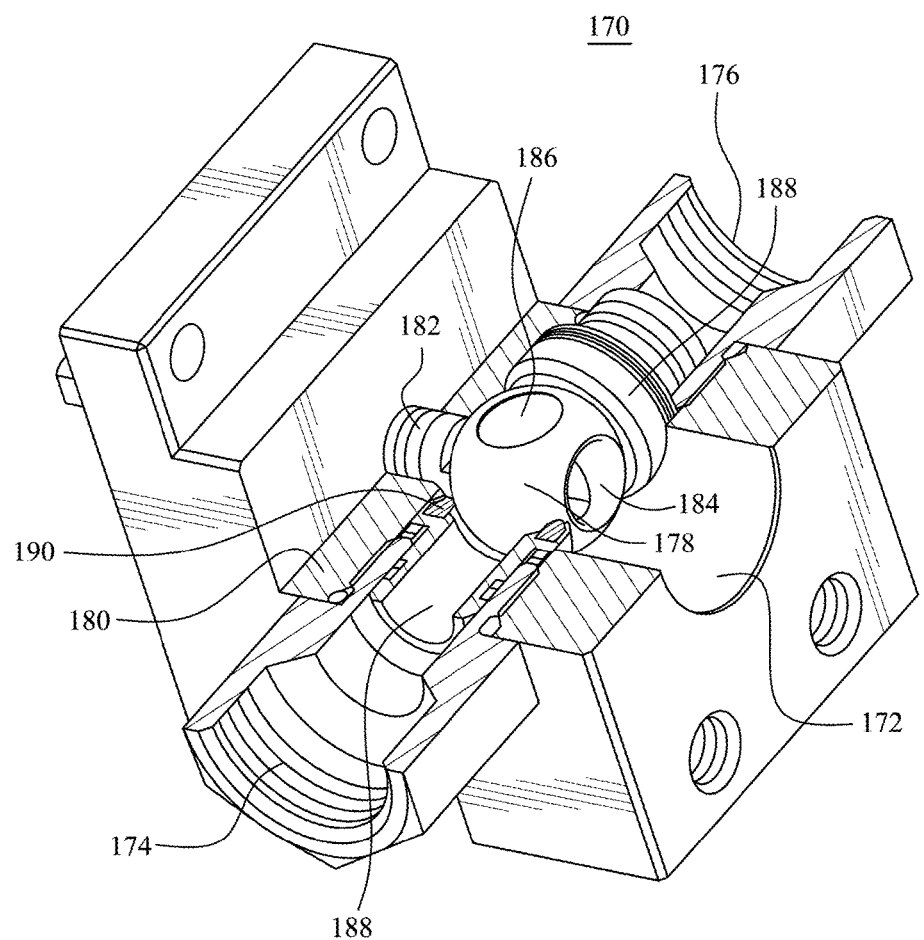
FIG. 8 is a perspective view of another embodiment of a pressure balanced valve.

FIG. 8 shows another embodiment of a pressure balanced valve 170 having a single liquid inlet 172 and liquid outlets 174, 176. The pressure balanced valve 170 is based on a conventional three-way ball valve.

A generally spherical actuator 178 is encased in a housing assembly 180. The actuator rotates within a chamber in the housing assembly 180. The housing assembly 180 may be configured as a manifold housing multiple pressure balanced valves.

A drive shaft 182 is coupled to the actuator and rotates the actuator as the drive shaft is rotated by a drive mechanism (not shown) which may include a mechanical, pneumatic or hydraulic drive to turn the drive shaft.

The actuator 178 is hollow and has an internal chamber through which fluid flows from the inlet 172 to the outlets 174, 176. The actuator 178 includes an inlet opening 184 aligned with the rotational axis of the drive shaft 182 and with the inlet 172 to the housing assembly.

The actuator's outlet openings 186 are on opposite sides of the actuator and are not aligned with the axis of the drive shaft. The rotation of the drive shaft and actuator causes the openings 186 to align with the outlets 174, 176 of the housing to allow fluid to flow through the valve (an open position) and to be out of alignment with the outlets 174, 176 (as shown in FIG. 8) to close the valve and prevent fluid flow from the inlet to the outlets 174, 176 and between the outlets 174, 176.

Fluid from the inlet may fill voids between an outer surface of the actuator and interior surfaces of a chamber in the housing assembly that contains the actuator. The fluid applies equal pressure to all surfaces of the actuator such that the actuator is always pressure balanced within the housing assembly. The force needed to rotate the actuator need only be that needed to overcome the frictional forces between the housing assembly and the actuator and drive shaft.

A hollow plug 188 is between the actuator and each of the outlets 174, 176 of the housing assembly. The plugs 188 may be arranged at opposite sides of the actuator so that the actuator may be held between the plugs.

A ring seal 190 is held in a groove of a front face of each plug 188 and forms a bearing surface against the outer surface of the actuator. The ring seal prevents liquid flow around the actuator and into the outlets 174, 176 of the housing assembly.

Figure 9:
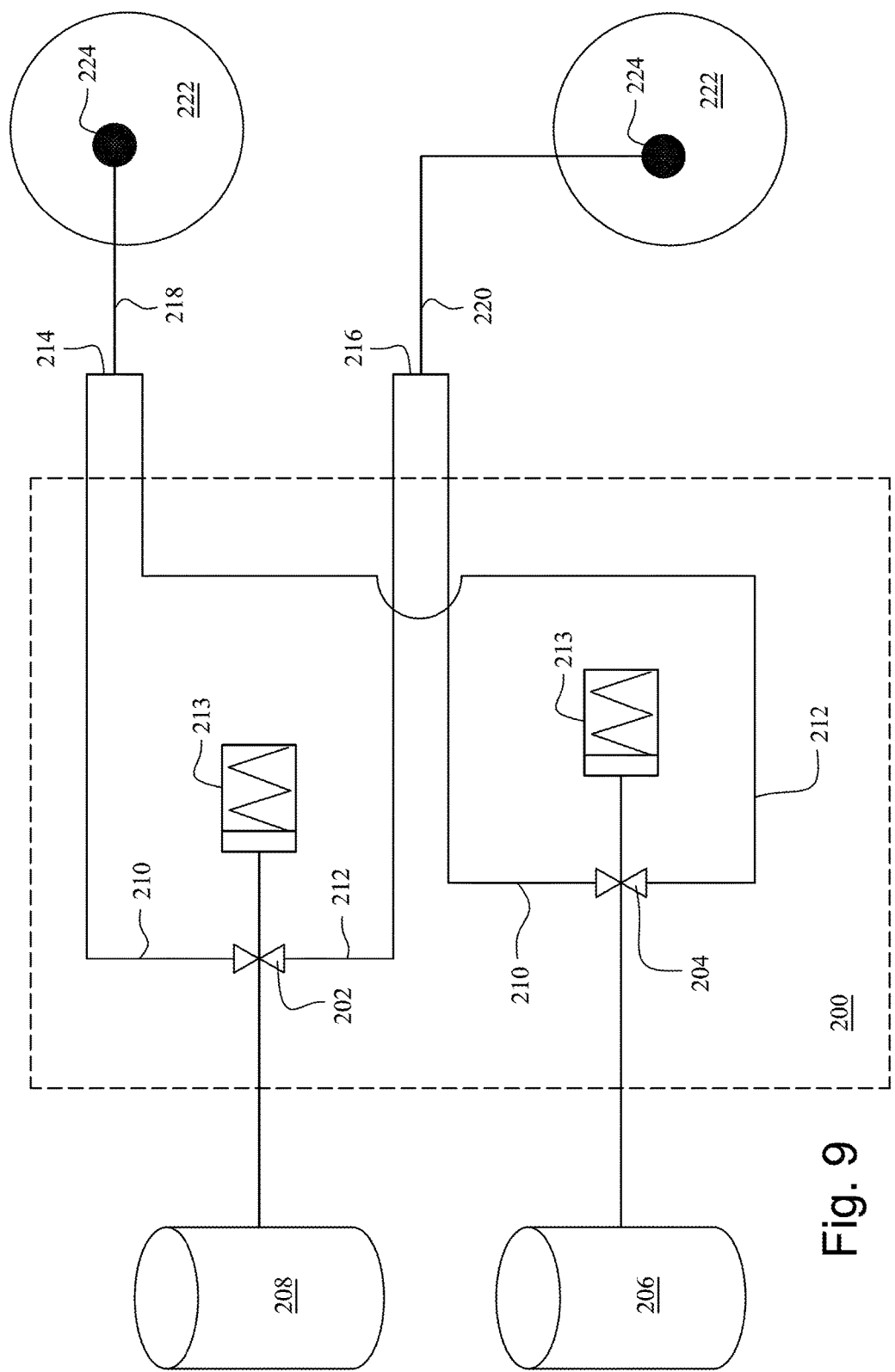
FIG. 9 is a schematic diagram of pressure balanced valve coupled to outlet pipes that connect and are configured to mix fluids flowing through the two valves.

FIG. 9 is a schematic diagram of a manifold 200 housing pressure balanced valves 202, 204 configured with their outlets coupled to provide fluid mixing downstream of the valves. A first pressure balanced valve 202 is coupled to a source of water 206, and a second pressure balanced valve 206 coupled to a source of liquid fuel 208. Each of the pressure balanced valves 202, 204 is controlled by a control device 213, that may be a mechanical shaft or other linkage or a pneumatic or hydraulic fluid control system.

Each valve is connected to two outlet pipes 210, 212. The outlet pipes 210 for each valve 202, 204 connect, e.g., are joined, at a connection 214. Similarly, the outlet pipes 212 for each valve 202, 204 connect, e.g., are joined, at a connection 216. A pipe 218, 220 extends from the connection to one of the combustion cans 222 and, specifically, to one of the fuel nozzle inlets 224 on the can.

By connecting the outlet pipes from two pressure balanced valves, the fluids flowing through the valves may be mixed as they flow from the valves to the combustion cans. For example, fuel flowing through the first pressure balanced valve 202 flows through the outlet pipes and, at the connections 214, 216, mixes with water flowing through the outlet pipes from the second pressure balanced fuel valve 204.

By including a connection 210 between outlets of different pressure balanced valves, different fluids, e.g., fuel and water, may be mixed and directed to the combustion can. If mixing is not desired, one valve may be turned off and the other opened to, for example, allow fuel to flow to the combustion can while no water flows to the can. The use of connections 214, 216 between outlet pipes 210, 212 reduces the piping needed to connect the pressure balanced valves to the combustion can and reduces the pipe connections at the combustion.

The pressure balanced valves disclosed herein greatly reduces the force required to move the actuators that turn on and off flow through the valve. Further, the valves with two outlets may provide ON-OFF flow functions to two combustion cans which allows for a significant reduction in the number of valves as compared to previous valves which served a single combustion can. Reducing the number of valves needed reduces the weight of the fuel skid that supports the valves, and reduces the quantity and total cost of the valves.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A pressure balanced valve for a combustor of a gas turbine, the pressure balanced valve comprising:
    a housing including a fluid inlet and fluid outlets;
    an actuator within the housing and movable between an open position and a closed position, wherein the actuator is spherical, includes an interior chamber and has an actuator inlet to the interior chamber which is aligned with the fluid inlet of the housing and has actuator outlets from the interior chamber which are each aligned with one of the fluid outlets of the housing while the actuator is in the open position;
    a fluid path through the housing and the interior chamber of the actuator and the fluid path extends from the housing fluid inlet to the housing fluid outlets, wherein the fluid path allows fluid flow through the housing and the actuator while the actuator is in the open position;
    wherein the fluid path is blocked while the actuator is in the closed position such that fluid cannot flow from the housing fluid inlet to the housing fluid outlets and fluid cannot flow between the housing fluid outlets, and
    wherein a first housing outlet of the housing fluid outlets is connected to a first combustion can of the combustor, and a second housing outlet of the housing fluid outlets is connected to a second combustion can of the combustor.

2. The pressure balanced valve of claim wherein the pressure balanced valve is mounted in a manifold housing a plurality of valves.

3. The pressure balanced valve of claim 1, wherein the pressure balanced valve includes a bias displacing the actuator to the closed position.

4. The pressure balanced valve of claim 1, wherein the housing includes an interior cavity having a circular cross section and the interior cavity houses the actuator.

5. The pressure balanced valve of claim 1, wherein the first housing outlet is connected to a first housing outlet of a second pressure balanced valve and the second housing outlet is connected to a second housing outlet of the second pressure balanced valve.

6. A fuel skid configured to supply fuel to combustion cans of a gas turbine, the fuel skid comprising:
    conduits, wherein each of the conduits is configured to be coupled to a source of liquid;
    a manifold housing pressure balanced fuel valves, wherein each of the pressure balanced fuel valves includes:
        a housing including a fluid fuel inlet and fluid fuel outlets, wherein the fluid fuel inlet is connected to a respective one of the conduits;
        an actuator within the housing and movable between an open position and a closed position, wherein the actuator is spherical having an interior chamber and includes an inlet to the interior chamber which is aligned with the fluid fuel inlet of the housing and fuel outlets from the interior chamber that are each aligned with one of the fluid fuel outlets of the housing while the pressure balanced fuel valve is in the open position;
        a fluid fuel path through the housing extending through the housing fluid fuel inlet, the interior chamber of the actuator and the housing fluid fuel outlets;
        wherein the fluid fuel path is blocked while the actuator is in the closed position such that fluid fuel cannot flow from the housing fluid fuel inlet to the housing fluid fuel outlets and fluid fuel cannot flow between the housing fluid fuel outlets;
        wherein a first housing outlet of the housing fluid fuel outlets is connected to a first combustion can of the combustion cans and a second housing outlet of the housing fluid fuel outlets is connected to a second combustion can of the combustion cans.

7. The fuel skid of claim 6, wherein each of the pressure balanced fuel valves is fluidly connected to a different pair of the combustion cans.

8. The fuel skid of claim 6, wherein each of the pressure balanced fuel valves includes a bias displacing the actuator to the closed position.

9. The fuel skid of claim 6, wherein the housing includes an interior cavity having a circular cross section and the interior cavity houses the actuator.

10. The fuel skid of claim 6, wherein the housing is a single piece component with a housing of the manifold.

11. A method to control liquid flow to combustion cans of a gas turbine, the method comprising:
    supplying liquid to each of the combustion cans from pressure balanced valves, wherein each of the pressure balanced valves is coupled to at least two of the combustion cans and supplies the liquid to the at least two combustion cans,
    wherein each of the pressure balanced valves includes a housing having a fluid inlet and fluid outlets; a spherical actuator in the housing and the spherical actuator includes an internal chamber and has an actuator inlet to the interior chamber which is aligned with the fluid inlet of the housing and has actuator outlets from the interior chamber which are each aligned with one of the fluid outlets of the housing while the actuator is in the open position, and a fluid path through the housing and the interior chamber of the actuator, and the fluid path extends from the housing fluid inlet to the housing fluid outlets;

supplying the liquid to the fluid inlets to each of the fuel valves;

for each of the pressure balanced valves, turning the spherical actuator to an open position to allow liquid to flow from the housing fluid inlet, through the fluid path and through to the housing fluid outlets to two of the combustion cans, wherein each of the two combustion cans are connected to a respective one of the housing fluid outlets of the pressure balanced valve, and for each of the pressure balanced valves, turning the spherical actuator to a closed position to block liquid flow through the fluid path and block flow between the housing fluid outlets of the pressure balanced fuel valve.

12. The method of claim 11 further comprising, for at least one of the pressure balanced fuel valves, turning the actuator between the open and closed positions while the liquid flowing through the at least one pressure balanced fuel valve applies a balanced pressure to the spherical actuator.

13. The method of claim 11 wherein the liquid is liquid fuel.

14. The method of claim 11 further comprising:

mixing the liquids from the first housing outlet of a first pressure balanced valve and the first housing outlet of a second pressure balanced valve in a first passage and delivering a first mixed liquid from the first passage to a first combustion can of the combustion cans; and mixing the liquids from the second housing outlet of the first pressure balanced valve and the second housing outlet of the second pressure balanced valve in a second passage and delivering a second mixed liquid from the second passage to a second combustion can of the combustion cans.

* * * * *

UNITED STATES PATENT AND TRADEMARK OFFICE
CERTIFICATE OF CORRECTION

PATENT NO. : 10,337,412 B2
APPLICATION NO. : 15/184525
DATED : July 2, 2019
INVENTOR(S) : Selfridge et al.

Page 1 of 1

It is certified that error appears in the above-identified patent and that said Letters Patent is hereby corrected as shown below:

In the Claims

Claim 2, Column 10, Line 1, change "claim" to --claim 1,--

Signed and Sealed this
Tenth Day of September, 2019

Andrei Iancu
*Director of the United States Patent and Trademark Office*